United States Patent [19]

Thun

[11] Patent Number: 4,833,391
[45] Date of Patent: May 23, 1989

[54] METHOD AND APPARATUS FOR CHARGING LEAD-ACID-ACCUMULATORS

[75] Inventor: Niels Thun, Sønderborg, Denmark

[73] Assignee: Inelco A/S, Fjerritslev, Denmark

[21] Appl. No.: 90,123

[22] Filed: Aug. 27, 1987

[30] Foreign Application Priority Data

Aug. 29, 1986 [DK] Denmark .............................. 4149/86

[51] Int. Cl.$^4$ ............................................... H02J 7/04
[52] U.S. Cl. ........................................ 320/23; 320/32; 320/39
[58] Field of Search .................................... 320/22–24, 320/31, 32, 39, 40

[56] References Cited

U.S. PATENT DOCUMENTS 4,146,830  3/1979  Foster .................................. 320/32 X
4,217,533  8/1980  Van Beek ........................... 320/32 X
4,695,784  9/1987  Reynolds ................................ 320/32

*Primary Examiner*—R. J. Hickey
*Attorney, Agent, or Firm*—Thomas R. Morrison

[57] ABSTRACT

The charging apparatus for lead-acid-accumulators controls the charging current and the charging voltage above the gassing voltage level according to a linearly declining characteristic. The charging current and the charging voltage are converted to a current signal (50) and a voltage signal (60) which are normalized (70, 80) and combined (150) into an indicating signal (160) which is constant as long as the charging current and the charging voltage follow the linear characteristic. A regulating device (130, 140, 40) compares the indicating signal (160) to a reference signal (132) for correcting the charging current and the charging voltage. The current signal (50) and the voltage signal (60) are converted to the indicating signal (160) by means of a weighted summation. For performing the summation there is provided an operational amplifier circuit.

9 Claims, 2 Drawing Sheets

METHOD AND APPARATUS FOR CHARGING LEAD-ACID-ACCUMULATORS

The life of lead-acid-accumulators in cyclic operation, for example in electrically powered vehicles which frequently are discharged relatively deeply and are recharged, is to some degree dependent on the progress of the recharging. The recharging process should proceed as leniently as possible, but usually it has to take place within a defined lapse of time, for example a night between two working days or a week-end.

The capacity of a lead-acid-accumulator is normally indicated in ampere hours (Ah). Based on the capacity, there is also defined a nominal load current $I_5$ which is equal to the capacity divided with five hours; if loaded at $I_5$, the accumulator will be completely discharged after five hours. Normally it is this load current that is used as the basis in specifying the characteristics of accumulators, and in charging it is common not to use a greater charging current than $I_5$; commonly speaking, this value is called "nominal current" or "100% charging current".

In the charging of a lead-acid-accumulator, some of the charging current will, as soon as the cell voltage rises above the so-called gassing level at 2.4 V (this value is somewhat dependent on temperature), be used in dissociation of the water in the accumulator-acid producing hydrogen and oxygen. During that process and the acid, is strongly heated. The amount of gas produced increases with the intensity of the current. This so-called gassing phase strains the accumulator very much, because intense gassing may cause erosion of material from the accumulator plates.

As is well known, the charging takes place by connecting a charging current source (a charging appartus) to the terminals of the accumulator. The progress of the charging is hereafter determined by the output characteristic of the charging apparatus and the characteristics of the accumulator during the charging.

There exist a number of technical standards where the output characteristics of charging apparatus are laid down, especially with the intention of protecting the accumulator. German standard DIN 41 772 has a survey over the different types of characteristics and gives abbreviated designations for these.

An output characteristic wherein the output voltage is mainly constant (+ −2% of nominal value) over the whole range of current values, is called a U-characteristic. An output characteristic wherein the output current is mainly constant (+ −2% of nominal value) over the whole range of voltage values is called an I-characteristic. An output characteristic in which the output current decreases with increasing output voltage is called a W-characteristic. The designations U, I and W have been commonly adopted in the area of charging apparatus.

The charging of an accumulator may happen in the way that some specific segments of these characteristics are followed in a predetermined sequence. In accordance with DIN 41 772, it has become common that the said letter designations are put together in a sequence corresponding to the charging process, and are used as code for the function of a charging apparatus. Accordingly there are charging apparatus of the W-type, IU-type, IUW-type etc.

Charging apparatus of W-type may be very simply constructed because a transformer with a rectifier will have such a characteristic (a power hyperbola) approximately. For charging apparatus of this kind of lead-acid-accumulators, DIN 41 774 mainly prescribes that the apparatus shall be able to supply $I_5$ at a cell voltage of 2 V, that the charging current value shall decline to 50% of $I_5$ at a cell voltage of 2.4 V (the gassing level), and that the current value shall decline to 25% of $I_5$ at a cell voltage of 2.65 V.

Charging apparatus of IUW-type and IUI-type for lead-acid-accumulators as mentioned in DIN 41 773 are presently used relatively often. Herein the charging normally takes place at first with a constant current (I-characteristic) at $I_5$, in which case the cell voltage increases until the gassing level is reached. Thereafter the voltage is kept on the gassing level following a U-characteristic. During this latter stage the charging current decreases according to the rising charge of the battery.

Continued charging at constant voltage will, however, lead to an unacceptably long charging time for accumulators in cyclic operation, because the charging current decreases to values that are too low. When the charging current has declined to 20% of $I_5$, the output characteristic of the charging apparatus is, in the case of an IUW-process, changed into following a W-characteristic which is specified in such a way that it crosses the voltage axis at a cell voltage of 2.7 V; that is to say that when the charging apparatus is idling, or when the charging current is equal to 0, it has to supply off a voltage of 2.7 V per cell to the accumulator. In IUI-charging apparatus a change to constant current (I-characteristic) takes place again, when the charging curretn has gone down to 20% of $I_5$.

It is common for the two lastly mentioned types of charging apparatus that the charging process has to be discontinued (manually or by an automatic time control) when the accumulator is fully charged, because otherwise the strong gassing in the W-phase and the second I-phase, respectively, will have a destructive effect on the accumulator.

In relation to this known art, it is an object of the invention to provide a method for charging lead-acid-accumulators as mentioned in the pre-characterizing part of claim 1 wherein there is produced a lesser gas volume in the gassing phase without an appreciable extension of the charging time.

As stated in the characterising part of claim 1, this purpose is attained by so controlling the charging current and the charging voltage per accumulator cell that above the gassing level they follow mainly a linear characteristic which crosses the gassing level at about $0.5\ I_5$ and whose inclination is between about $-0.5\ V/I_5$ and about $-0.1\ V/I_5$.

According to the invention, the charging current and the charging voltage above the gassing level are controlled according to a W-characteristic which has a considerably lesser inclination than has been proposed before. It has been found that by charging according to such a characteristic, there is produced an appreciably reduced quantity of gas, without the charging time rising unacceptably. According to the invention, one particularly avoids the relatively strong increase in the voltage which, according the state of the art, takes place in the last part of the charging phase, when the charging current has sunk almost to 0. The lesser gas production and the lesser voltage load both increase the life of accumulator.

According to the preferred embodiment of the invention stated in claim 2, the charging characteristic above the gassing level has an inclination of about $-0.2\ V/I_5$ and crosses the gassing level at about $0.5\ I_5$. In the charging of lead-acid-accumulators following this characteristic, charging time is extended about 30% in case of a 25% discharged accumulator (i.e., remaining capacity 75% of the capacity in the fully charged state), and the produced quantity of gas in the gassing phase is about 50% less than when charging according to a charging progress which above the gassing level follows a W-characteristic according to DIN 41 773 or DIN 41 774, with an accumulator discharged 80% the charging time is about 12% longer and the produced quantity of gas is about 30% less.

A charging apparatus according to the invention for carrying out the method according to claim 1 or 2, wherein the charging current above the gassing level decreases with increasing voltage according to a mainly linear characteristic, with a controlable charging current source, a current sensor, and a voltage sensor for the accumulator, and a control device coupled to the sensors and the current source for controlling the charging process, is as stated in claim 3, characterised in that the control device is furnished with at leas one converter device for converting the signals of the sensors to an indication signal indicating whether the charging current and the charging voltage follow the wanted linear characteristic, and with at least one regulating device which, by comparing the indication signal with a reference signal, controls the charging current source for correcting the charging current and the charging voltage to compliance with the linear characteristic.

The regulating is thus simply done by the regulating device comparing the indication signal with a constant reference signal. Such a regulating device may, as is known per se, be an operational amplifier in a suitable coupling whose output signal is converted to a control signal for the charging current source. Couplings for this purpose are well known as it is common in charging apparatus to equip the rectifier of the charging current source with a thyristor coupling which is controlled by controlling the switch-on time of the thyristors by using a continuous or a sampling regulator which receives an input signal from a comparator of the above mentioned kind.

According to claim 4, the indication signal may be produced, leaving out a factor, by 3 weighted summation of the signals which are in proportion with the charging current and the charging voltage. Here it is the relation between the weights of the signals that determines the inclination of the characteristic determined by the summation, where the indication signal remains constant. This is to say simply, that if, for example, the charging current changes, the charging voltage has to change in relation thereto, and this relation is determined by the weights of the signal in the summation, so that the indication signal, which corresponds to the summation result, may remain constant. The resulting characteristic is linear.

According to claim 5 the converter device may be very simply made with two voltage generators and a voltage divider coupled therein between, wherein the indication signal is collected between the resistors of the divider. Together with the conversion ratio of the voltage generators, it is the resistance ratio in the voltage divider that determines the inclination of the characteristic which the charging current and the charging voltage have to follow for the indication signal to remain constant.

In an embodiment as stated in claim 6 the charging apparatus may be adjusted to accumulators of different capacity simply by adjusting one single adjusting device which controls the weight by which the charging current enters into determining the output characteristic of the apparatus. Advantageously the adjusting device may be put on an operating panel, so that the charging apparatus maa be adjusted manually according to need, as stated in claim 7. The claims 8 and 9 state preferred embodiments of the voltage generators and the adjusting device.

An exemplary embodiment of the invention is described in the following with reference to the accompanying drawings.

Figure 1:
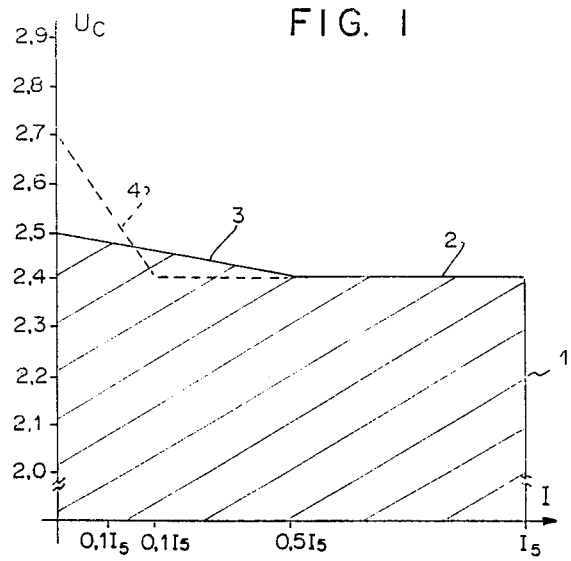
FIG. 1 shows an example of an output characteristic of an IUW charging apparatus according to the invention compared with the known characteristic of IUW charging apparatus.

In the course of the charging according to the invention, as shown on FIG. 1, the charging current is kept constantly on the value $I_5$ following an I characteristic 1 until the cell voltage $U_c$ reaches the gassing level at 2.4 V. Thereafter a U-characteristic 2 is followed, until the charging current has declined to $0.5\ I_5$, whereafter a w characteristic 3 is followed which crosses the voltage axis at 2.5 V per cell.

The method of the charging according to the invention may be compared to the known method shown with a dotted line, where the U characteristic 2 is followed till $0.2\ I_5$, whereafter it continues with a W characteristic 4, which runs appreciably steeper than that according to the invention, and crosses the voltage axis at 2.7 V per cell in the accumulator.

Figure 2:
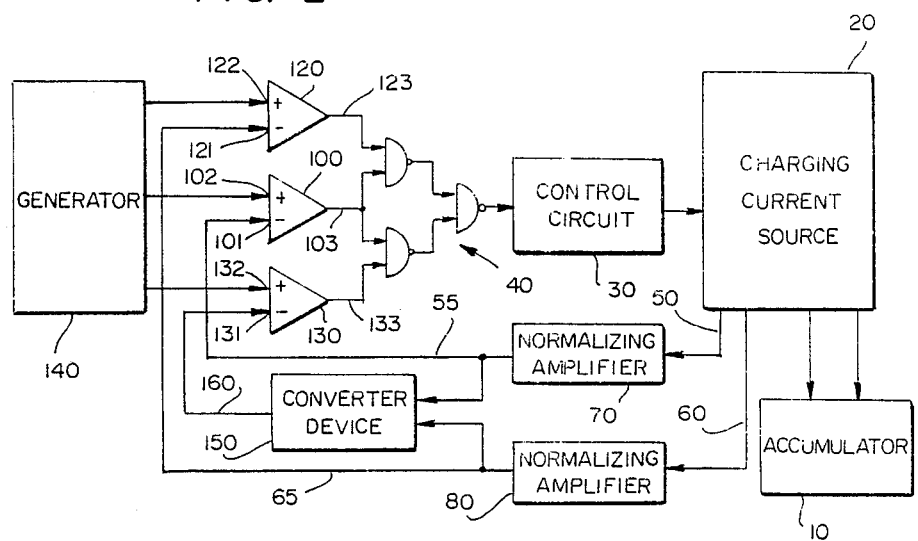
FIG. 2 shows a block diagram of a charging apparatus according to the invention.

From FIG. 2 shows a block diagram of a charging apparatus according to the invention, whose output characteristic corresponds to that shown on FIG. 1. The accumulator 10 is connected to a controllable charging current source 20 with a transformer for transforming down the voltage of the supplied alternating current and a thyristorized rectifier device, whose output current and output voltage are controlled by controlling the switch-on time of the thyristors. Such charging current sources are known per se.

The control signal for the thyristors is supplied by a control circuit 30 which receives a correcting signal from a network 40 of NAND logic circuits, which signal indicates whether the switch-on point for the thyristors has to be moved forward or backward in time in order to correct the output current and the output voltage of the charging current source in accordance with the wanted output characteristic.

To produce the correcting signal, the charging current source has two signal output terminals 50 and 60, where a voltage is given off in proportion with the charging current and the charging voltage, respectively. The signals on the output terminals 50 and 60 are filtered and normalized so as to vary between 0 V and an identical maximum value, for example 8 V, by means of normalizing amplifiers 70 and 80. The current signal 55 is hereafter connected to an input terminal 101 of a comparator 100, which on another input terminal 102 receives a reference voltage from a reference voltage generator 140. The voltage signal 65 is supplied to an input terminal 121 of a comparator 120 which on another input terminal 122 receives a reference voltage from the generator 140.

By combining the signals 55 and 65, there is produced an indication signal 160 by a converter device 150, which indication signal is constant as long as the output current and the output voltage of the charging current source 20 follow the segment 3 of the characteristic shown on FIG. 1. The converter device 150 will be more closely described further down. The indication signal 160 is compared on one input terminal 131 of a comparator 130 with a reference voltage from the generator 140 on the other input terminal 132 of the comparator.

The reference voltages on the input terminals 102, 122 and 132 are chosen in such a way that the output signal 103 of the comparator 100 switches between two different values depending on whether the charging current is above or below $I_5$; the comparator 120 switches the output signal 123 at a charging voltage of 2.4 V per cell, and the comparator 130 switches the output signal 133 depending on whether the voltage of the indication signal produced by the converter device 150 is below or above the constant value which it has to follow for the charging currrent source to be following the segment 3 of the characteristic.

From the output signals of the comparators 103, 123 and 133 it may be read where the actual charging current and the actual charging voltage are in relation to the output characteristic shown on FIG. 1. Also, it can be read from the said output signals in which way the switch-on point of the thyristors has to be displaced in order to correct the actual condition according to the wanted characteristic. When, for example, the output signals 103 and 123 show that the charging voltage is below 2.4 V per cell and the current is less than $I_5$, an earlier switching of the thyristors in the charging current source 2 has to be triggered so as to increase the output current in the direction towards $I_5$. Similar logic conclusions ma be drawn for all possible combinations of those signal values that may occur in the signals 103, 123 and 133.

The rules for advancing or retarding the switch-on point of the thyristors may be determined without difficulty from the course of the characteristic shown on FIG. 1 by someone skilled in the art, and are transformed in accordance with the known procedures for calculating logic circuits to a logic coupling 40 where the input signals are the comparators' output signals 103, 123 and 133 and the output signal shifts between two values which cause an advancing or a retardation, respectively, of the ignition time of the thyristors via the control circuit 30. The logic circuit shown on FIG. 2 consists of three NAND-circuits which cause, coupled as shown, that the ignition time of the thyristors is advanced when the charging current and the charging voltage lie on the boundary of or within the area which is shown hatched on FIG. 1, and is retarded otherwise.

Figure 4:
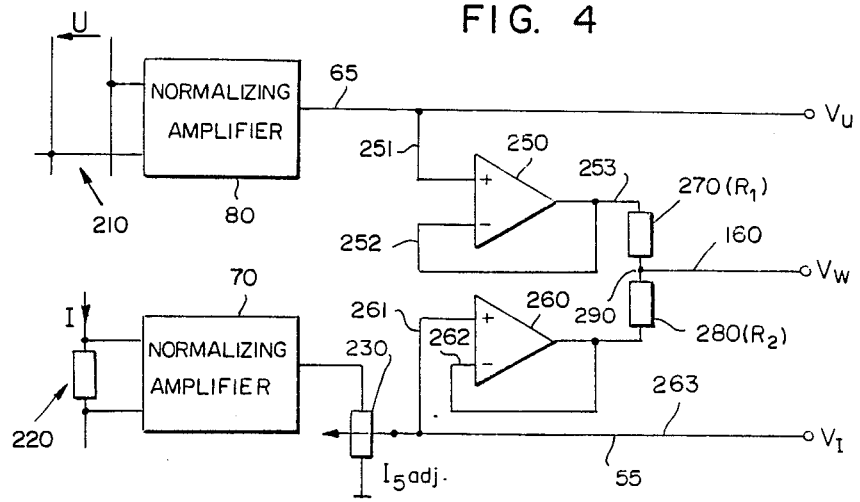
FIG. 4 shows a detailed diagram of the converter device shown on FIG. 2 for producing the indication signal.

The converter device 150 and the normalizing amplifiers 70 and 80 are shown in greater detail on FIG. 4. The charging voltage is measured between the output terminals of the charging current source, as shown schematically at 210, and is supplied to the normalizing amplifier 80. Its output voltage 65, also denoted as $V_U$, is proportional to the charging voltage and normalized to vary between 0 and 8 V. The charging current is measured across a series resistance in one of the output terminnals of the charging current source, as schematically shown at 220, and the voltage signal measured, which is proportional to the charging current, is supplied to the normalizing amplifier 70. Its output voltage, which is normalized to vary between 0 and 8 V, is supplied to a potentiometer 230 from which a signal voltage 55, also denoted as $V_I$, is collected via the contact arm thereof.

The potentiometer 230 is used as an adjusting organ for adapting the nominal charging current $I_5$ of the charging apparatus in relationship to the capacity of a lead-acid-accumulator which is to be charged. When the contact arm is nearest to the normalizing amplifier 70, the same signal level on the contact arm will be generated by a smaller charging current than when, e.g., the contact arm is in the middle of the potentiometer; equivalently it may be said that, by moving the contact arm of the potentiometer towards the normalizing amplifier 70, one diminishes the value of the nominal charging current $I_5$, which value is the basis for the regulation of the output characteristic.

The converter device 150 proper consists of two operational amplifiers 250 and 260 and two succeeding resistors 270 and 280. The operational amplifiers work as voltage generators whose output voltages are combined to form a weighted sum by the resistors 270 and 280, also denoted $R_1$ and $R_2$. Thus the signal voltages $V_U$ and $V_I$ are supplied to the non-inverting input terminals 251, 261 of the operational amplifiers 250, 260, respectively, while the output voltage of the operational amplifiers is fed back directly to the inverting input terminals 252, 262. The resistors $R_1$ and $R_2$ are connected in series between the output terminals 253 and 263 of the operational amplifiers, and the indication signal $V_W$ is collected from the point of connection 290 between the resistors $R_1$ and $R_2$.

By way of a suitable choice of the values of the resistors $R_1$ and $R_2$ it may be achieved that the voltage $V_W$ is constant as long as the charging current I and the charging voltage U follow the section 3 of the characteristic shown on FIG. 1. This may be seen from the following brief calculation.

The change of the charging voltage with changes in the charging current over the section 3 of characteristic may be expressed by the following equation $$U = U_0 - aI, \tag{1}$$

wherein U is the charging voltage, I is the charging current, $U_0$ is the open circuit output voltage of the charging apparatus and a is the inclination of the section of characteristic.

The charging voltage and the charging current are converted to the signals $V_U$ and $V_I$ by the amplifiers 70 and 80 according to the following relation:

$$V_U = bU = bU_0 - abI, \tag{2}$$

$$V_I = cI, \tag{3}$$

wherein b is the amplification factor or gain of the amplifier 80 and c is the amplification factor or gain present in the combination of the resistor used in the measurement, the amplifier 70 and the potentiometer 230.

The coefficients b and c may be determined in advance from the observation that the signals $V_U$ and $V_I$ vary between 0 and a predetermined maximum voltage which is 8 V in the example shown.

The circuit coupling of the two operational amplifiers 250 and 260 with the resistors $R_1$ and $R_2$ as shown on FIG. 4 converts the signals $V_U$ and $V_I$ into the signal $V_W$ according to the following equation:

$$V_W = V_U R_2/(R_1+R_2) + V_I R_1/(R_1+R_2). \quad (4)$$

Putting in the original expressions for U and I this gives:

$$V_W = bU_0 R_2/(R_1+R_2) - abIR_2/(R_1+R_2) + cIR_1/(R_1+R_2). \quad (5)$$

It is apparent herefrom that the open circuit value of the voltage $V_W$ (I=0) will be $$V_{W0} = bU_0 R_2/(R_1+R_2), \quad (6)$$

and that the voltage $V_W$ will remain equal to this value permanently, provided that $$abIR_2/(R_1 R_2) = cIR_1/(R_1+R_2), \quad (7)$$

which gives $$abR_2 = cR_1 \quad (8)$$

or $$R_1/R_2 = ab/c. \quad (9)$$

Accordingly, because the coefficients b and c are known in advance, $R_1$ and $R_2$ can now be specified starting from the rule of dimensioning given in equation (9) and observing the known rules for dimensioning operational amplifier circuits.

It is apparent from the calculation above that the operational amplifier network shown on FIG. 4 converts the current signal and the voltage signal into an indication signal which is constant as long as the charging current and the charging voltage follow the section 3 of the characteristic shown on FIG. 1. This may be called a weighted summation wherein the weights of the signals determine the ratio according to which the charging voltage must change when the driving current changes to make the weighted sum of the signals remain constant.

Figure 3:
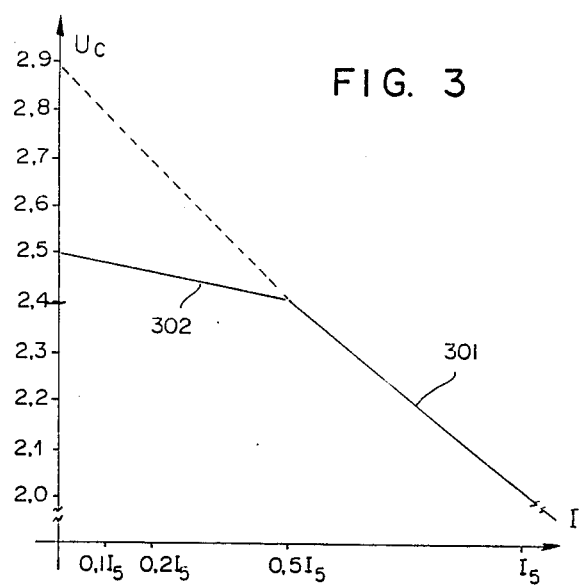
FIG. 3 shows an example of an output characteristic of a WW charging apparatus according to the invention compared with the known characteristic of W charging apparatus.

On FIG. 3 there is shown a different example of an output characteristic of a charging apparatus according to the invention, and wherein two W-characteristics 301 and 302 are adhered to. Below the gassing level the W-characteristic 301 runs as prescribed in DIN 41774 while the section 302 has a lesser inclination in accordance with the invention.

From the above it will be apparent to someone skilled in the art that for controlling the charing current and the charging voltage of a charging apparatus in accordance with the two W-characteristics of FIG. 3 one may use two converter devices of the kind as shown on FIG. 4 together with a logic circuit 40 which is modified according to the circumstances. The apparatus may be a modification of the apparatus of FIG. 2.

In the embodiment of a charging apparatus according to the invention shown on FIG. 2 the output signals of the comparators 100, 120 and 130 are, by means of the logic circuit 40, combined into a logic signal which indicates whether the instant of ignition of the thyristors is to be moved backward or forward in time. Instead of the logic circuit 40 one could also use a number of analog switches connected to the signals 55, 65 and 160 for choosing, under the control of the output signals of the comparators, the applicable one of the three signals 55, 65 and 100 according to which signal control must be exercised at any time to follow the output characteristic shown on FIG. 1 and for supplying that signal to an anaog regulator circuit 30. In this case control would be achieved by means of an analog comparison of the selected signal, that is, one of the current signal 55, the voltage signal 65 and the indication signal 160, respectively, with the respective reference voltage. Other modifications ma be made without thereby departing from the invention as set forth in the appended claims.

I claim:

1. A method for charging lead-acid-accumulators, wherein the charging current above the charging voltage level at which gassing occurs decreases with increasing charging voltage according to a mainly linear characteristic, characterized in that the charging current and the charging voltage per accumulator-cell is controlled in such a way, that the linear characteristic (3,302) followed above the gassing voltage level crosses the gassing voltage level at about 0.5 $I_5$, and has an inclination (a) between approximately 0.5 $V/I_5$ and approximately 0.1 $V/I_5$.

2. A method according to claim 1, characterized in that the linear characteristic (3,302) followed above the gassing voltage level has an inclination (a) of about 0.2 $V/I_5$.

3. Apparatus for charging lead-acid-accumulators, where the charging current above the charging voltage level at which gassing occurs decreases with increasing charging voltage according to a mainly linear characteristic, and which is provided with a controllable charging current source, a current sensor for providing a first signal in proportion with the charging current, a voltage sensor for providing a second signal in proportion with the charging voltage, and a control device coupled to the sensors and to the charging current source for controlling the charging process, characterized in that the control device is furnished with at least one converter device (70,80,150) for converting the first signal (50,55) and the second signal (60,65) to an indication signal (160) which is constant to the extent that the charging current and the charging voltage are following the linear characteristic (3,302), and with at least one regulating device (30,40,130) which is configured to provide, by comparing the indication signal (160) with a reference signal (132), a regulating signal for the charging current source (20) such that the charging current and the charging voltage at any time are corrected in accordance with the linear characteristic (3,302).

4. Charging apparatus according to claim 3, characterized in that the converter device (70,80,150) is configured to generate a weighed sum of the first signal (50,55) and the second signal (60,65), and to generate the indication signal (160,$V_W$) in proportion therewith, such that the inclination (a) of the linear characteristic (3,302) is determined by the weights of the signals in the summation mainly.

5. Charging apparatus according to claim 4, characterized in that the converter device (70,80,150) is provided with a first voltage generator (230,260) for converting the first signal (50,55) to a first voltage (263) in proportion therewith, a second voltage generator (250) for converting the second signal (60,65) to a second voltage (253) in proportion therewith, and two resistances ($R_1,R_2$) connected in series and each coupled to one of the said voltages (253,263) at its terminal, remote from the connection point (290) between the resistances, and that the regulating device (30,40,130) is coupled to receive the voltage at the connection point (290) between the resistances ($R_1,R_2$) as indication signal.

6. Charging apparatus according to claim 5, characterized in that the first voltage generator (230,260) is provided with an adjusting device (230) for adjusting the conversion factor between the first signal (50,55) and the first voltage (263) in such a way that both the charging current and the inclination of the linear characteristic may be simultaneously adjusted to accumulators of different capacity by operating the adjusting device (230).

7. Charging apparatus according to claim 6, characterized in that the adjusting device (230) is placed on an operating panel (10) as to be manually operable.

8. Charging apparatus according to anyone of claims 5 to 7, characterized in that each voltage generator consists of an operational amplifier (250,260) and wherein the signal is supplied to a non-inverting input terminal (251,261) and the voltage is collected from an output terminal (253,263) which is connected with an inverting input terminal (252,262) of the operational amplifier (250,260).

9. Charging apparatus according to claim 8, characterized in that first signal is supplied to the non-inverting input terminal (261) of the first voltage generator (260) via a contact lever of a potentiometer (230) serving as adjusting device.

* * * * *